United States Patent [19]

Shorts

[11] Patent Number: 5,584,899
[45] Date of Patent: Dec. 17, 1996

[54] FLUID COLLECTION AND FILTRATION APPARATUS

[76] Inventor: Kevin L. Shorts, 15345 Valley Rd., Mead, Pa. 16335

[21] Appl. No.: 506,540

[22] Filed: Jul. 24, 1995

[51] Int. Cl.⁶ .................................................. B01D 45/08
[52] U.S. Cl. ............................ 55/257.5; 55/259; 55/323; 55/437; 55/462; 134/109
[58] Field of Search ........................... 55/257.5, 259, 55/462, 463, 465, 432, 433, 439, 320, 323, 437, 471–473, DIG. 18, DIG. 36, DIG. 46; 118/326, DIG. 7; 134/109–111, 58 R, 85, 88

[56] References Cited

U.S. PATENT DOCUMENTS

| | | | |
|---|---|---|---|
| 2,347,728 | 5/1944 | Bell | 55/439 X |
| 2,352,356 | 6/1944 | Albertson | 134/111 |
| 2,675,012 | 4/1954 | Scales | 134/85 |
| 2,737,260 | 3/1956 | Jenison | 55/323 X |
| 3,130,024 | 4/1964 | Vaughan, Jr. | 55/257.5 X |
| 3,428,058 | 2/1969 | Niedzielski et al. | 134/109 X |
| 3,499,181 | 3/1970 | Barthel | 55/433 X |
| 3,904,431 | 9/1975 | Dinerman | 134/88 |
| 3,970,560 | 7/1976 | Metzger | 134/111 X |
| 4,321,064 | 3/1982 | Vargo | 55/521 X |
| 4,333,745 | 6/1982 | Zeanwick | 55/DIG. 18 |
| 4,387,286 | 6/1983 | Inoue | 210/222 X |
| 5,063,835 | 11/1991 | Rockx | 55/DIG. 46 |
| 5,143,102 | 9/1992 | Blaul | 134/58 R |

OTHER PUBLICATIONS

Donaldson Company, Inc., "The New Torit® Dryflo™ Mist Collector", 1993.
Donaldson Company, Inc., "Torit® Dryflo™ Mist Collectors", 1994.

Primary Examiner—Richard L. Chiesa
Attorney, Agent, or Firm—Richard C. Litman

[57] ABSTRACT

A collection apparatus for collecting oil or other liquids forcibly removed from a dirty item by directed air pressure includes a generally cubical metal receptacle having a wooden cover. The dirty item is placed in a duct-like construction in a front side of the apparatus and a source of air pressure is used to remove oil or other liquids from the item, thereby producing mist. This mist is directed into the apparatus and travels to a far side of the apparatus, where it strikes a deflector. The deflector directs the mist to either of two sides of the apparatus. A suction unit, located in a bottom side of the apparatus, pulls the mist downward through a filter and finally into a collecting container.

16 Claims, 4 Drawing Sheets

FLUID COLLECTION AND FILTRATION APPARATUS

BACKGROUND OF THE INVENTION

1. Field of the Invention

The present invention relates generally to waste collectors, and more specifically to collectors of spray mist.

2. Description of Prior Art

Spray mist results from numerous industrial processes, and typically such mist is hazardous to human health, messy, and destructive towards the environment. For these reasons, numerous apparatus have been developed for containing waste liquid released during industrial process. However, no such apparatus, prior to the present invention, succeeds in fully collecting and containing waste spray in the manner and with the structure of the present invention.

U.S. Pat. No. 2,352,356, issued to Victor N. Albertson, on Jun. 27, 1944, describes an auto parts washer. The washer is like a sink, in that it has a spray nozzle used to spray parts lying on a deck. There is no suction unit and there are no partitions for directing air flow.

U.S. Pat. No. 2,675,012, issued to Frank J. Scales, on Apr. 13, 1954, describes a washing assembly for automotive parts. The assembly is akin to a sink, in that it has a spray nozzle used to spray parts lying on a tier of trays. There is no suction unit and there are no partitions for directing air flow.

U.S. Pat. No. 3,428,058, issued to Albert Niedzielski et al., on Feb. 18, 1969, describes a mask washer including a closed container and a spray pump. There is no suction unit and there are no partitions for directing air flow.

U.S. Pat. No. 3,904,431, issued to David Dinerman, on Sep. 9, 1975, describes spray-gun cleaners in which spray guns are mounted for cleaning. There is no suction unit and there are no partitions for directing air and mist flow.

U.S. Pat. No. 3,970,560, issued to Herman U. Metzger, on Jul. 29, 1976, describes a parts washer having two pressurizable solvent tanks. Solvent is forced back and forth between the tanks, washing parts along the way. There is no suction unit and there are no partitions for directing air and mist flow.

U.S. Pat. No. 4,321,064, issued to John W. Vargo, on Mar. 23, 1982, describes a filter apparatus that can be used in a spray booth. The filter has a plurality of apertured sheets, some of which are corrugated. There is no suction unit and there are no partitions for directing air and mist flow in a curved manner.

U.S. Pat. No. 4,387,286, issued to Kyoshi Inoue, on Jun. 7, 1983, describes a splash control and liquid purifier. The apparatus of this patent magnetically traps ferrous particles from dirty machining liquid. There is no suction unit and there are no partitions for directing air and mist flow.

U.S. Pat. No. 5,143,102, issued to Ronald I. Blaul, on Sep. 1, 1992, describes a high pressure parts cleaner and method. The cleaner has a grit blaster, solvent spray nozzles, and a mechanism for neutralizing used solvent. There are no partitions for directing air and mist flow.

Published references, "The New Torit® Dryflo™ Mist Collector", Copyright 1993, and "Torit® Dryflo™ Mist Collectors", Copyright 1994, published by Donaldson Company, Inc., show filtration devices that receive waste material via a conduit from a separate, physically distant mist-collecting device. Thus, the titles of the references are misleading, inasmuch as the devices shown in the reference do not collect mist, but rather filter mist that has been collected by another mechanism, undisclosed. These published references do not show an apparatus that supports a device during spray cleaning, nor an apparatus that deflects, contains, and directs mist to an aperture where the mist is expelled.

None of the above inventions and patents, taken either singly or in combination, is seen to describe the instant invention as claimed.

SUMMARY OF THE INVENTION

A collection apparatus according to the present invention for collecting oil or other liquids forcibly removed from a dirty item by directed air pressure comprises a generally cubical metal receptacle having a wooden cover. The dirty item is placed in a duct-like construction in a front side of the apparatus and a source of air pressure is used to remove oil or other liquids from the item, thereby producing mist. This mist is directed into the apparatus and travels to a far side of the apparatus, where it strikes a deflector. The deflector directs the mist to either of two sides of the apparatus. A suction unit, located in a bottom side of the apparatus, pulls the mist downward through a filter and finally into a collecting container.

Accordingly, it is a principal object of the invention to provide a support apparatus for use while cleaning a dirty object with directed air pressure.

It is another object of the invention to direct and collect mist produced during a high-air-pressure cleansing process.

It is a further object of the invention to retrieve liquid from mist collected during a cleansing process.

Still another object of the invention is to protect persons and objects from spray mist.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
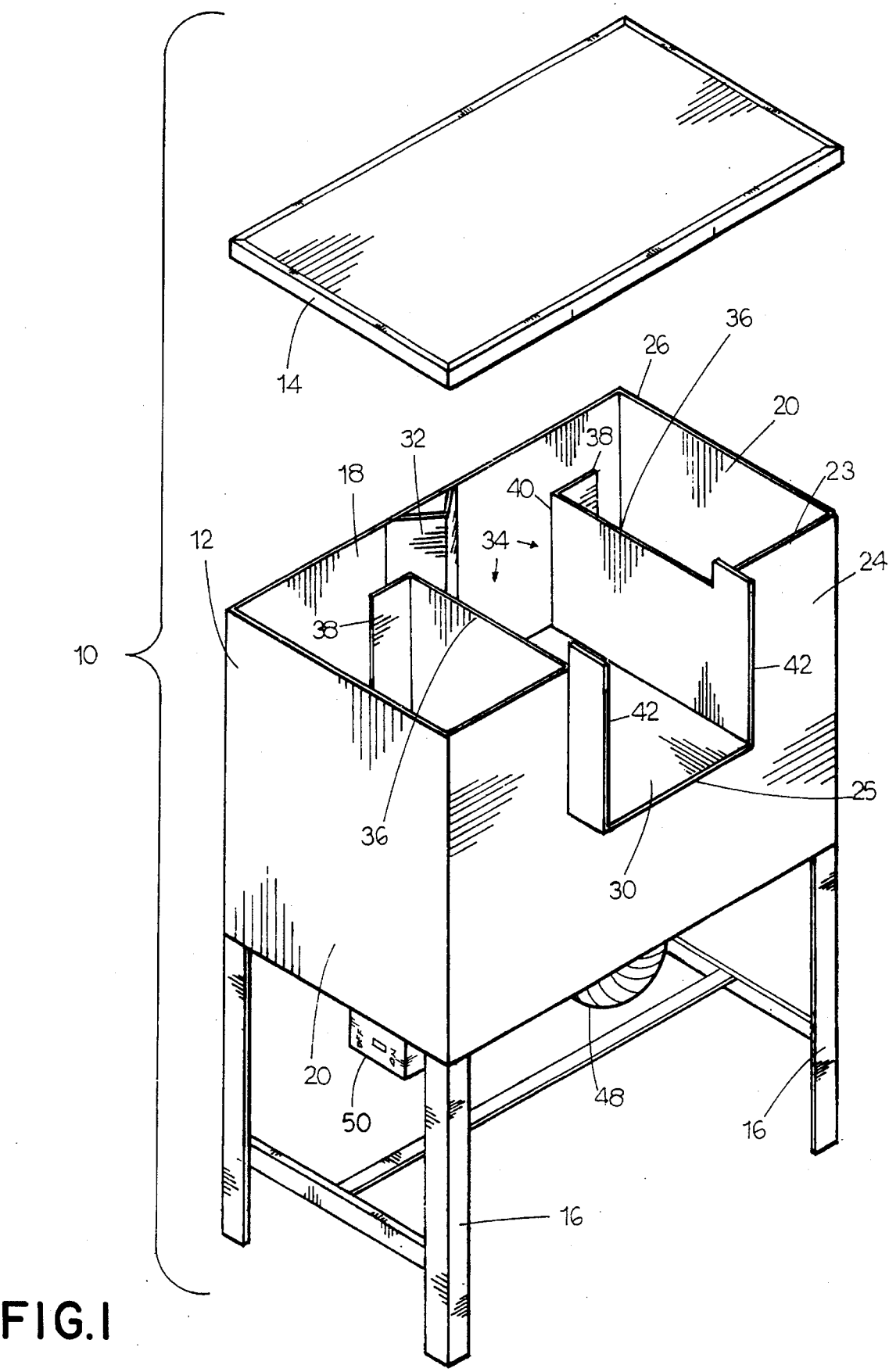
FIG. 1 is an exploded, perspective of the present invention.

The present invention provides a stand, mist deflector and filter for receiving, collecting, and filtering waste spray mist resulting from cleaning and other industrial processes. These objects are accomplished in such a way that waste mist is diverted from its source and towards a receiving suction device.

Referring to the drawings, a fluid filtration and collection apparatus 10 according to the present invention, shown particularly in FIGS. 1–4, has a generally cubical mist receptacle 12 with a cover 14 dimensioned and configured to releasably cover and close the mist receptacle 12, and support legs 16. The cover 14 is dimensioned and configured to releasably cover and close an open top side 26 of the mist receptacle. Preferably, the cover 14 is wooden, as this material has advantageous properties, such as sound dampening. Other materials, such as metals and plastics can be used.

The mist receptacle 12 has a far wall 18, two side walls 20, a bottom wall 22, a C-shaped front wall 24 having a top edge 23 and a notch 25 in the top edge 23, and an open top side 26. The bottom wall 22 has an aperture 28. There is an internal horizontal support 30 connected to and centrally traversing the notch 25 in the C-shaped front wall 24. Preferably, this internal horizontal support 30 slants downward into the mist receptacle 12 with an angle of two to four degrees, preferably three degrees so as to be lower at portions of the support 30 far from the front wall 24 than at portions of the support 30 near to said front wall 24. In this way, liquid disposed on the internal horizontal support 30 tends to flow into the mist receptacle 12, rather than out of the mist receptacle 12. A V-shaped deflector member 32 is connected to and disposed vertically on the far wall 18 of the mist receptacle 12.

Figure 1A:
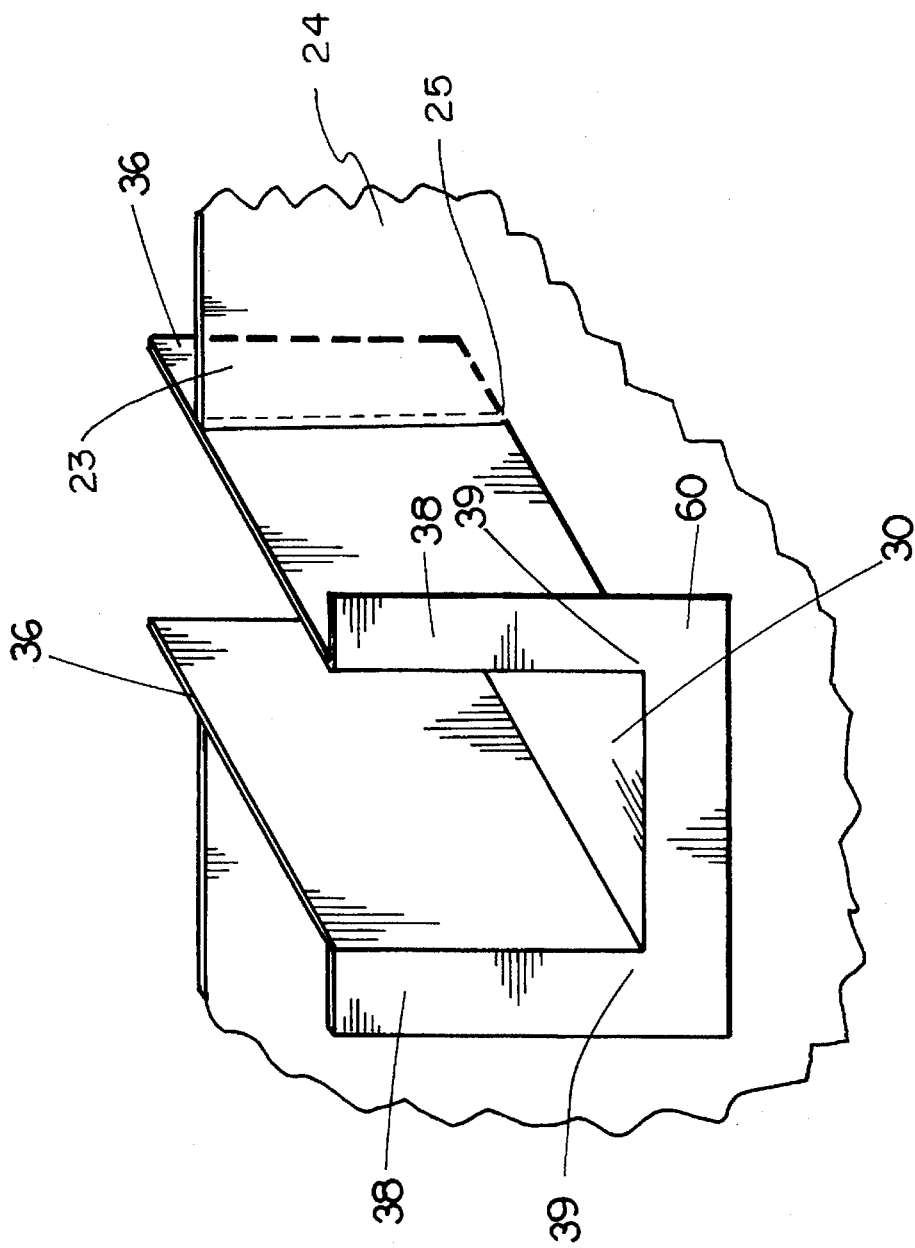
FIG. 1A is a partial perspective of the baffle members in the present invention.

Two L-shaped baffles 34 each have a long rectangular member 36 and a short rectangular member 38, each of the long rectangular member 36 having a first end 40 and a second end 42. Each of the first end 40 of each of the long rectangular member 36 is connected to one and only one of each of the short rectangular members 38. Each of the second end 42 of each of the long rectangular member 36 is connected to the C-shaped front wall 24, with each of the L-shaped baffles 34 being disposed perpendicularly to, and connected to, the C-shaped front wall 24 and the internal horizontal support 30. Preferably, a lower baffle member 60 connects to a bottom side 39 of the short rectangular members 38, thereby forming an over-all C-shape by combination of the lower baffle member 60 and the short rectangular members 38 of the two L-shaped baffles 34. Together, the long rectangular members 36, the lower baffle member 60 and the internal horizontal support 30 are duct-shaped as in FIG. 1A, and, along with the cover 14, tend to direct flow of mist 52 from outside the mist receptacle 12 to inside the mist receptacle 12.

Figure 2:
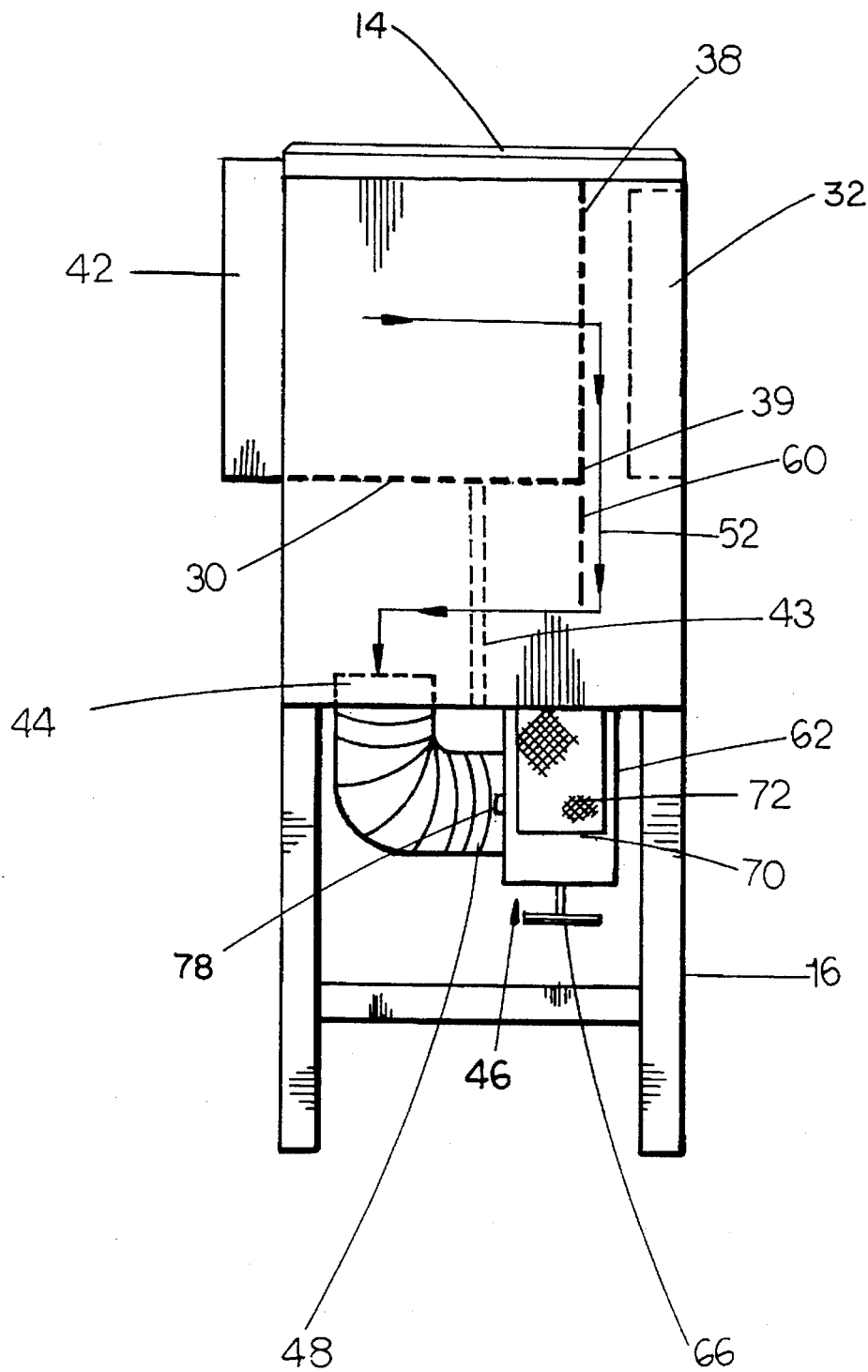
FIG. 2 is a left-side elevational view of the present invention.
Figure 3:
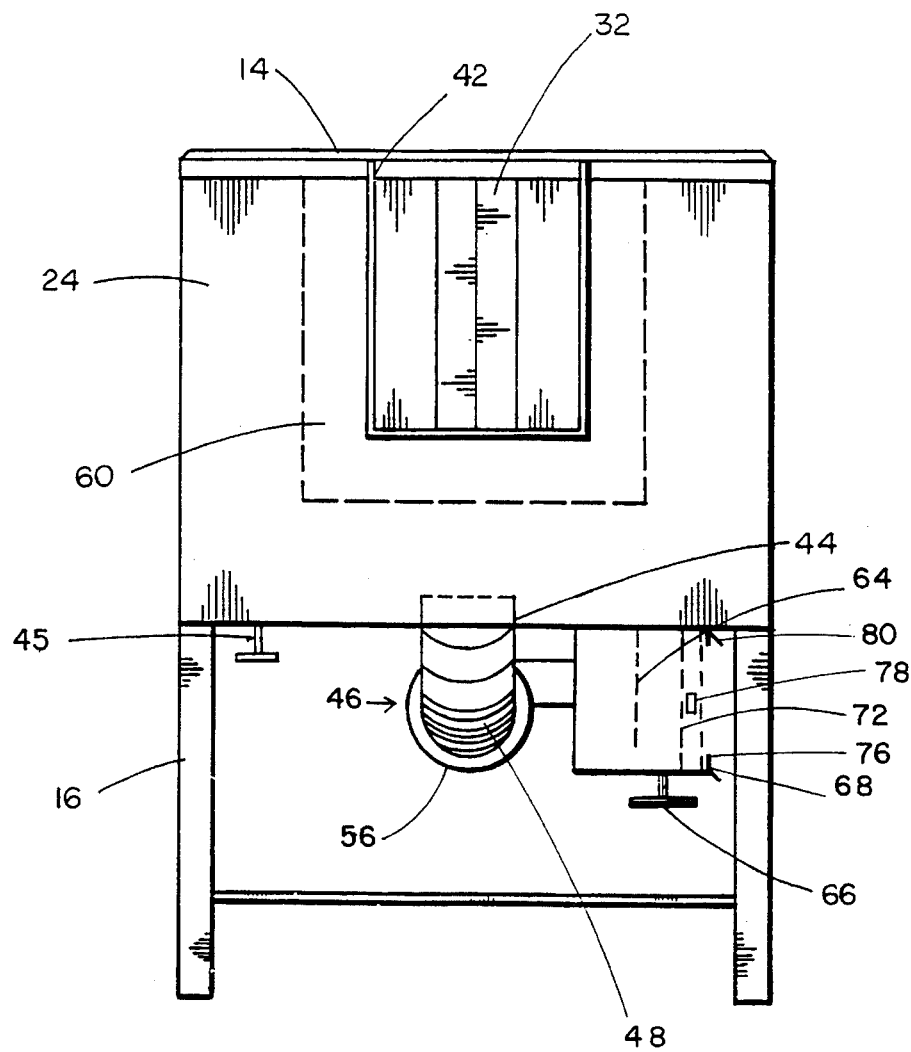
FIG. 3 is a front elevational view of the present invention.
Figure 4:
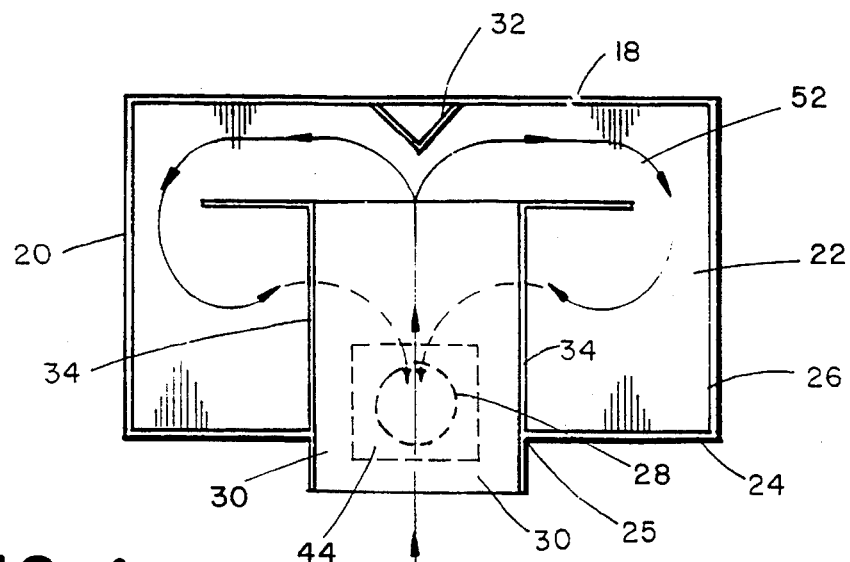
FIG. 4 is a top schematic view of mist flow in both embodiments of the present invention.

A support pillar member 43 disposed vertically in the mist receptacle 12 near the path of the mist 52, connecting internal horizontal support 30 and bottom wall 22, as in FIG. 2. This support pillar member 43 supports internal horizontal support 30 while mostly avoiding obstruction of mist flow. If mist 52 collects in the receptacle 12 drainage of flowing material occurs via a receptacle stop-cock 45 penetrating the bottom wall 22 of the receptacle 12. This receptacle stop-cock 45 is shown in FIG. 3.

There is a square filter 44 of known type covering all of the aperture 28 in the bottom wall, the aperture being generally circular. There is a suction unit 46 attached to the bottom wall 22, this suction unit 46 being dimensioned and configured to provide suction to the aperture 28. The suction unit 46 includes a squirrel cage blower 56, of known type. A switch 50 of known type controls the suction unit 46 by known means to selectively turn the squirrel cage blower 56 of the suction unit 46 on and off. Turning on the suction unit 46 creates a low pressure region in the area of the aperture 28 and thereby encourages mist 52 deflected by the deflector member 32 and contained by the baffles 34 to flow towards the aperture 28 and through the filter 44 covering the aperture 28, as shown schematically in FIG. 4.

The suction unit 46 in the first embodiment of the fluid filtration and collection apparatus 10 according to the present invention has a first fluid collection tube 48 having a squirrel cage blower 56, a fluid collection box 62 having an internal baffle 64, a collection box stop-cock 66 on a bottom side 68, and a cut out exit face 70 covered by a second filter 72 of known type. Preferably, this second filter 72 is preferably connected via a slide-in arrangement, wherein a handle 78 on the filter 72 is used to insert and mount the filter 72 in a slide-in track 76, which is dimensioned and configured to receive the filter 72. Various known connection means could be used.

In use of the apparatus 10, mist flows through the aperture 28 because of low pressure in the first fluid collection box 48 brought about by the squirrel cage blower 56. Mist 52 flows through the in-going blower conduit 54, the squirrel cage blower 56, the out-going blower conduit 58, and into the fluid collection box 62, where the mist 52 hits the internal baffle 64. Most of the mist 52 is thus stopped at this point and can be drained by the collection box stop-cock 66 on the bottom side of the fluid collection box 62. Any remaining mist is caught in the filter 72 covering the open cut out exit face 70, allowing fresh air to flow out of the fluid collection box 62. An air deflector 80 is dimensioned and configured to direct air flowing from said cut out exit face 70 away from a user of the invention, preferably downward.

It is to be understood that the present invention is not limited to the embodiments described above, but encompasses any and all embodiments within the scope of the following claims.

I claim:

1. A fluid collection and filtration apparatus, comprising:

a mist receptacle having a far wall, two side walls, a bottom wall having an aperture, a C-shaped front wall having a top edge and a notch in said top edge, and an open top side;

a V-shaped deflector member connected to and disposed vertically on said far wall of said mist receptacle;

an internal horizontal support connected to and centrally traversing said notch in said top edge of said C-shaped front wall;

two L-shaped baffles each having a long rectangular member and a short rectangular member, each said long rectangular member having a first end and a second end, each said first end of each said long rectangular member being connected to one and only one of each said short rectangular member, each said second end of each said long rectangular member being connected to said C-shaped front wall, each of said L-shaped baffles being disposed perpendicularly to, and connected to, said C-shaped front wall and said internal horizontal support.

2. The fluid collection and filtration apparatus according to claim 1, further including a receptacle stop-cock penetrating said bottom wall, whereby flowing material in said receptacle is drained.

3. The fluid collection and filtration apparatus according to claim 1, further including a cover dimensioned and configured to releasably cover and close said open top side of said mist receptacle.

4. The fluid collection and filtration apparatus according to claim 3, wherein said cover is wooden.

5. The fluid collection and filtration apparatus according to claim 1, further including a support pillar member disposed vertically in said receptacle, whereby said internal horizontal support is supported.

6. The fluid collection and filtration apparatus according to claim 1, further including a filter covering all of said aperture.

7. The fluid collection and filtration apparatus according to claim 1, further including a suction unit attached to said bottom wall outside of said mist receptacle, said suction unit being dimensioned and configured to provide suction to said aperture.

8. The fluid collection and filtration apparatus according to claim 7, wherein said suction unit further includes a collection box stop-cock for drainage.

9. The fluid collection and filtration apparatus according to claim 7, wherein said suction unit is selectively removable from and replaceable onto said mist receptacle.

10. The fluid collection and filtration apparatus according to claim 7, further including a switch disposed on said mist receptacle, said suction unit being selectively turned on and turned off by use of said switch.

11. The fluid collection and filtration apparatus according to claim 7, wherein said suction unit includes:

a fluid collection tube attached in communication with said aperture;

a squirrel cage blower connected to and in communication with said fluid collection tube, said blower being configured so as to withdraw gas from said mist receptacle through said aperture and said fluid collection tube; and a fluid collection box connected to and in communication with said squirrel cage blower, said fluid collection box having an internal, vertical baffle, a collection box stop-cock on a bottom side, and a cut out exit face covered by a filter.

12. The fluid collection and filtration apparatus according to claim 11, wherein said fluid collection box has an open bottom side.

13. The fluid collection and filtration apparatus according to claim 11, further including a slide-in track dimensioned and configured to receive said filter, said filter being mounted in said slide-in track.

14. The fluid collection and filtration apparatus according to claim 11, further including an air deflector dimensioned and configured to direct air flowing from said cut out exit face of said fluid collection box away from a user of the fluid collection and filtration apparatus.

15. The fluid collection and filtration apparatus according to claim 1, wherein said internal horizontal support is slanted so as to be lower at portions of said support far from said front wall than at portions of said support near to said front wall.

16. The fluid collection and filtration apparatus according to claim 15, wherein said internal horizontal support is slanted at an angle of two to four degrees.

* * * * *